US008006598B2

(12) United States Patent
Goettel et al.

(10) Patent No.: US 8,006,598 B2
(45) Date of Patent: Aug. 30, 2011

(54) SAW CHAIN DRIVE LINK WITH TAIL

(75) Inventors: Mike Goettel, Canby, OR (US); Arlan Way, Gladstone, OR (US)

(73) Assignee: Blount, Inc., Portland, OR (US)

( * ) Notice: Subject to any disclaimer, the term of this patent is extended or adjusted under 35 U.S.C. 154(b) by 0 days.

(21) Appl. No.: 12/619,570

(22) Filed: Nov. 16, 2009

(65) Prior Publication Data

US 2010/0058915 A1 Mar. 11, 2010

Related U.S. Application Data

(63) Continuation of application No. 11/877,618, filed on Oct. 23, 2007, now Pat. No. 7,637,192.

(60) Provisional application No. 60/863,091, filed on Oct. 26, 2006.

(51) Int. Cl.
*B27B 33/14* (2006.01)
*B23D 57/00* (2006.01)

(52) U.S. Cl. ........................................... 83/830; 83/934

(58) Field of Classification Search .................... 83/830, 83/833, 834, 831, 832, 835, 820; 30/384, 30/385, 383
See application file for complete search history.

(56) References Cited

U.S. PATENT DOCUMENTS 1,150,218 A 8/1915 Martin
3,180,378 A 4/1965 Carlton
3,329,183 A * 7/1967 Robinson ........................ 83/834
3,346,025 A 10/1967 Anderson
3,444,907 A 5/1969 Chadwick
3,951,027 A 4/1976 Arff
4,269,100 A * 5/1981 Deelman et al. ................ 83/834
4,348,927 A 9/1982 Olmr
4,353,277 A 10/1982 Silvon
4,425,830 A * 1/1984 Atkinson ........................ 83/833
4,459,890 A 7/1984 Dolata
4,558,621 A 12/1985 Nitschmann
4,581,968 A 4/1986 Gibson
4,590,836 A 5/1986 Doiron
4,604,932 A 8/1986 Doiron
4,625,610 A 12/1986 Petrovich
4,627,322 A 12/1986 Hayhurst, Jr.
4,756,221 A 7/1988 Nitschmann
5,257,568 A 11/1993 Nitschmann
6,308,606 B1 10/2001 Buchholtz
6,446,534 B1 9/2002 Harfst
6,748,840 B2 6/2004 Harfst
2003/0192418 A1 10/2003 Mang
2005/0115379 A1 6/2005 Schulz

FOREIGN PATENT DOCUMENTS

CA 721087 11/1965
GB 2067465 7/1981

* cited by examiner

*Primary Examiner* — Ghassem Alie
(74) *Attorney, Agent, or Firm* — Schwabe Williamson & Wyatt

(57) ABSTRACT

A saw chain for a chain saw is disclosed. Embodiments include a drive link that may be used in a saw chain, wherein the drive link includes a tail and a concavity that complements a depth gauge of a trailing cutting link, reducing and/or minimizing the drive link's protrusion into a gullet space of the cutting link. Embodiments of the invention may help improve cutting performance and further help reduce kickback potential.

16 Claims, 4 Drawing Sheets

SAW CHAIN DRIVE LINK WITH TAIL

CROSS REFERENCE TO RELATED APPLICATIONS

This Application is a continuation of, and claims priority to, U.S. application Ser. No. 11/877,618, filed on Oct. 23, 2007, which in turn claims priority to U.S. Provisional Application No. 60/863,091, filed on Oct. 26, 2006, the specifications of which are hereby incorporated by reference in their entirety except for those portions, if any, that are inconsistent with this disclosure.

TECHNICAL FIELD

The present invention relates to the field of saw chains, and in particular to a saw chain drive link having a tail adapted to inhibit kickback and to minimize impact to cutting speed.

BACKGROUND

Chain saws typically include an endless saw chain disposed to articulate around a saw bar. The saw chain generally includes various inter-coupled links, such as cutter links, drive links, and tie straps. Cutter links may be provided with a depth gauge in front of and slightly below a following cutting edge to substantially inhibit the cutter from taking an excessive bite or penetration into the wood. Excessive bite can occur particularly when there is contact between the chain at the upper quadrant of the bar nose and the material being cut (when cutting with the nose) or through accidental contact with a nearby branch or the like. Such contact may induce kickback.

Cutting speed is believed to be affected by the length and height and amount of free space in the gaps between the cutting teeth of the cutting links. When this space fills up the cutting teeth are forced away from the kerf bottom, i.e., out of the cutting mode. Particularly during a nose cut, the depth gauge of the cutting link will be pressed into the kerf bottom, thereby compressing the wood which allows the following cutting tooth to penetrate further into the kerf and take an undesired excessive bite that can cause kickback.

Cutting speed is believed to be further affected by the size and shape of the free space or gullet between the cutting teeth and the depth gauge of the cutting links. The gullet is a necessary space required in wood chip formation, transportation and egression from the cutting kerf. The gullet space may be optimized for cutting performance.

DESCRIPTION OF VARIOUS EMBODIMENTS

Figure 1:
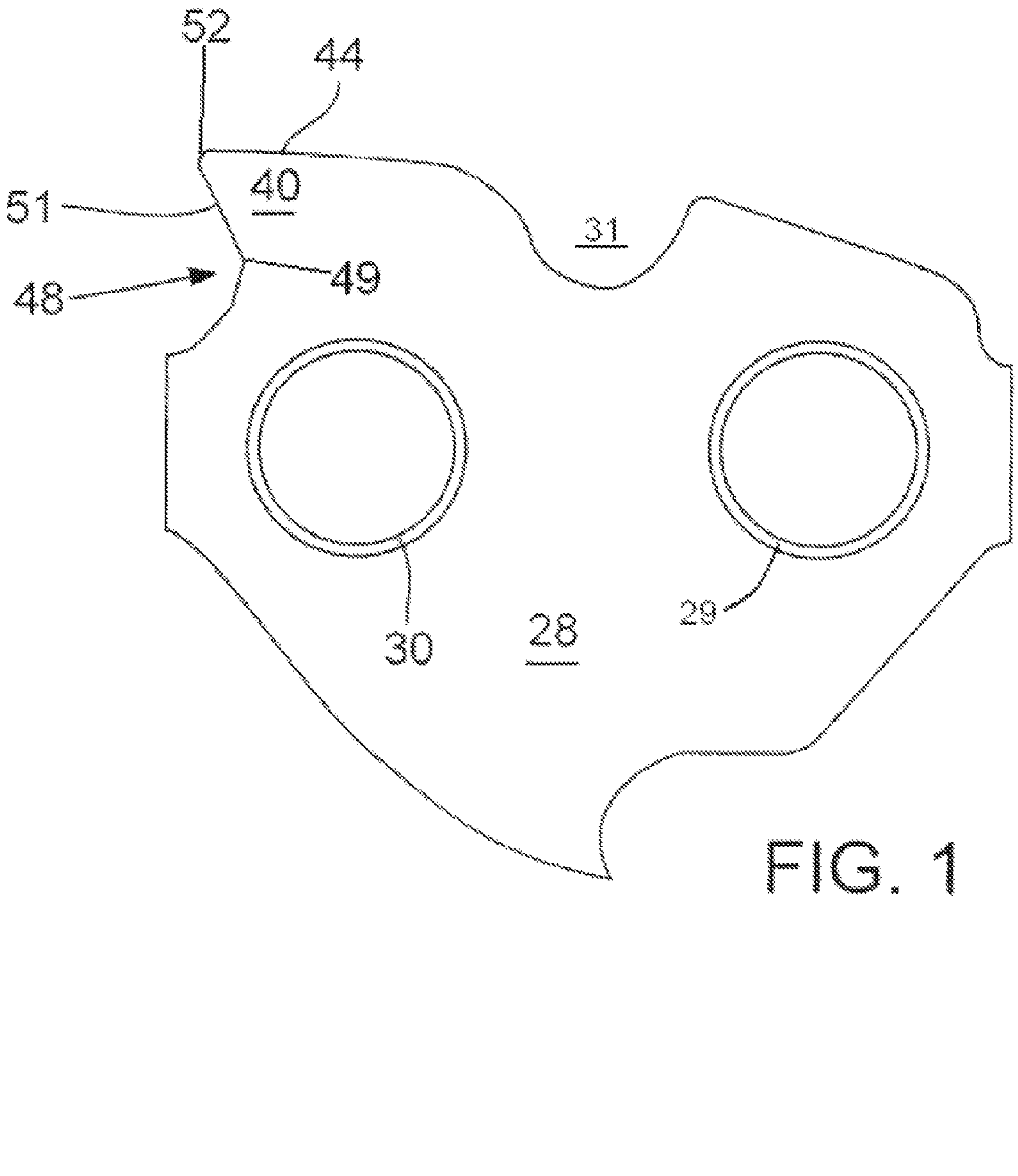
FIG. 1 illustrates a side view of a drive link in accordance with various embodiments.

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present invention.

For the purposes of the present invention, the phrase "A/B" means A or B. For the purposes of the present invention, the phrase "A and/or B" means "(A), (B), or (A and B)." For the purposes of the present invention, the phrase "at least one of A, B, and C" means "(A), (B), (C), (A and B), (A and C), (B and C), or (A, B and C)." For the purposes of the present invention, the phrase "(A)B" means "(B) or (AB)," that is, A is an optional element.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Embodiments of the present invention may provide an improved drive link (also referred to herein as a center link) having a rearwardly extended trailing guard portion of the drive link, which may be referred to as a tail. The tail may be positioned alongside a depth gauge of a cutting link that shares a common pivotal connection with the drive link. A double thickness of depth gauge and tail may be formed and may more effectively resist penetration into the wood fibers of the kerf bottom (as compared to an elongated single thickness) and may substantially enhance the resistance to excessive penetration of the following cutting link. In various embodiments, the shape of the rearwardly extending tail may be sized to minimize the extension into the (gullet) space between the depth gauge and the tooth of the cutting link.

In various embodiments, the rearward extension of the tail provides further resistance to penetration of the wood fibers, while minimizing negative effects on cutting performance by minimizing that portion of the center link that extends into the gullet of the cutting link, or in other words helping to maximize the gullet opening for enhanced chip flow. In various embodiments, the configuration of the leading and trailing portions of the center link may be cooperatively formed so that the ramp of the leading portion ramps the wood being cut in a direction that projects above the leading edge of the trailing portion, the leading edge of the trailing portion being itself shaped to avoid presenting a corner that might dig into the kerf, while the tail of the trailing portion may be formed to provide an extended edge along the top of the trailing portion. In various embodiments, the drive link may also be relieved in a center area forward of the trailing portion of the center link to provide added chip carrying capacity.

FIG. 1 illustrates a drive link 28 according to various embodiments of the invention. A drive link 28 may have a tail 40 extending rearward from the body of the center or drive link. The tail 40 may reduce kickback by extending somewhat radially as it traverses the nose of a chain saw bar. In addition, the tail 40 may increase the surface area of the drive link 28 that may be engaged in the kickback event thus reducing kickback energies. In addition the length and shape of the tail may be modified to optimize cutting performance.

In various embodiments, the drive link 28 may include a cutout area 31, which may serve to increase the chip carrying capacity of the chain. In various embodiments, the cut out portion 31, may be moved farther forward in the drive link body in order to increase the surface area at the rear portion of the bumper drive link, which may further help reduce the kickback effect.

Figure 2:
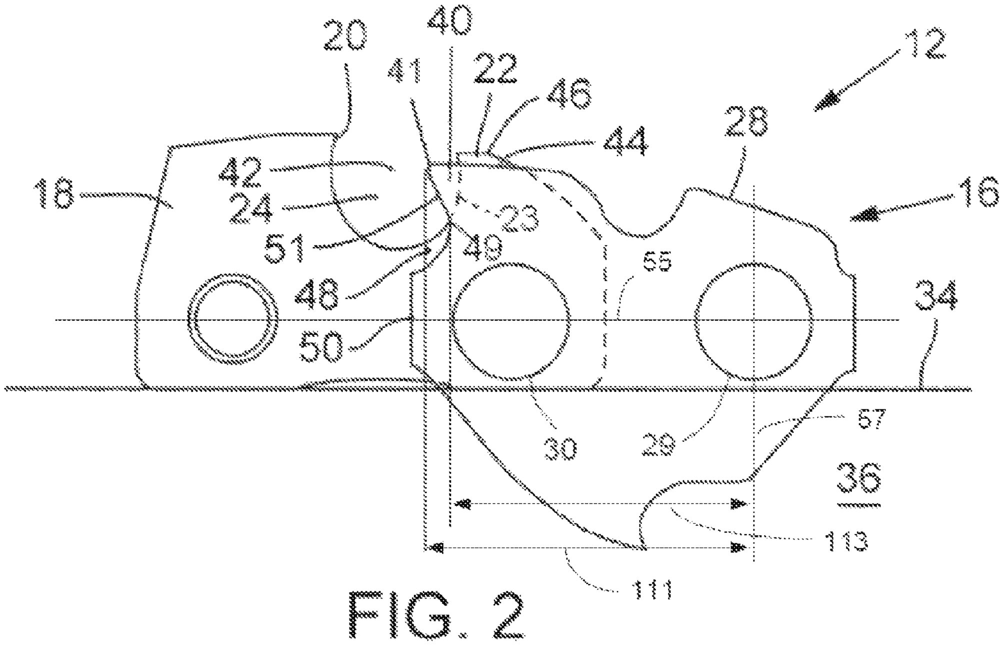
FIG. 2 illustrates a side view of a cutting link coupled to a drive link in accordance with various embodiments.
Figure 3:
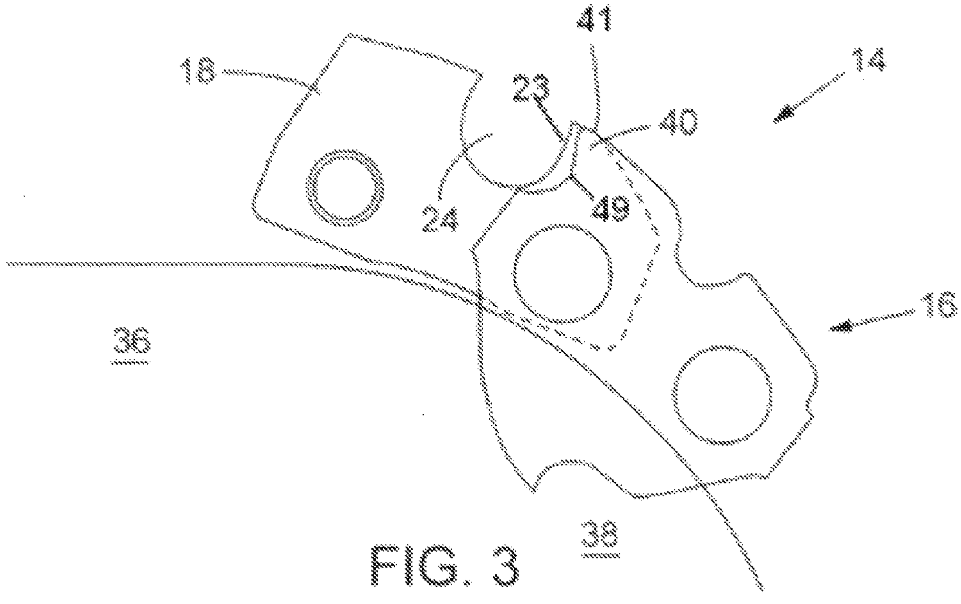
FIG. 3 illustrates a side view of a cutting link coupled to a drive link in accordance with various embodiments.
Figure 4:
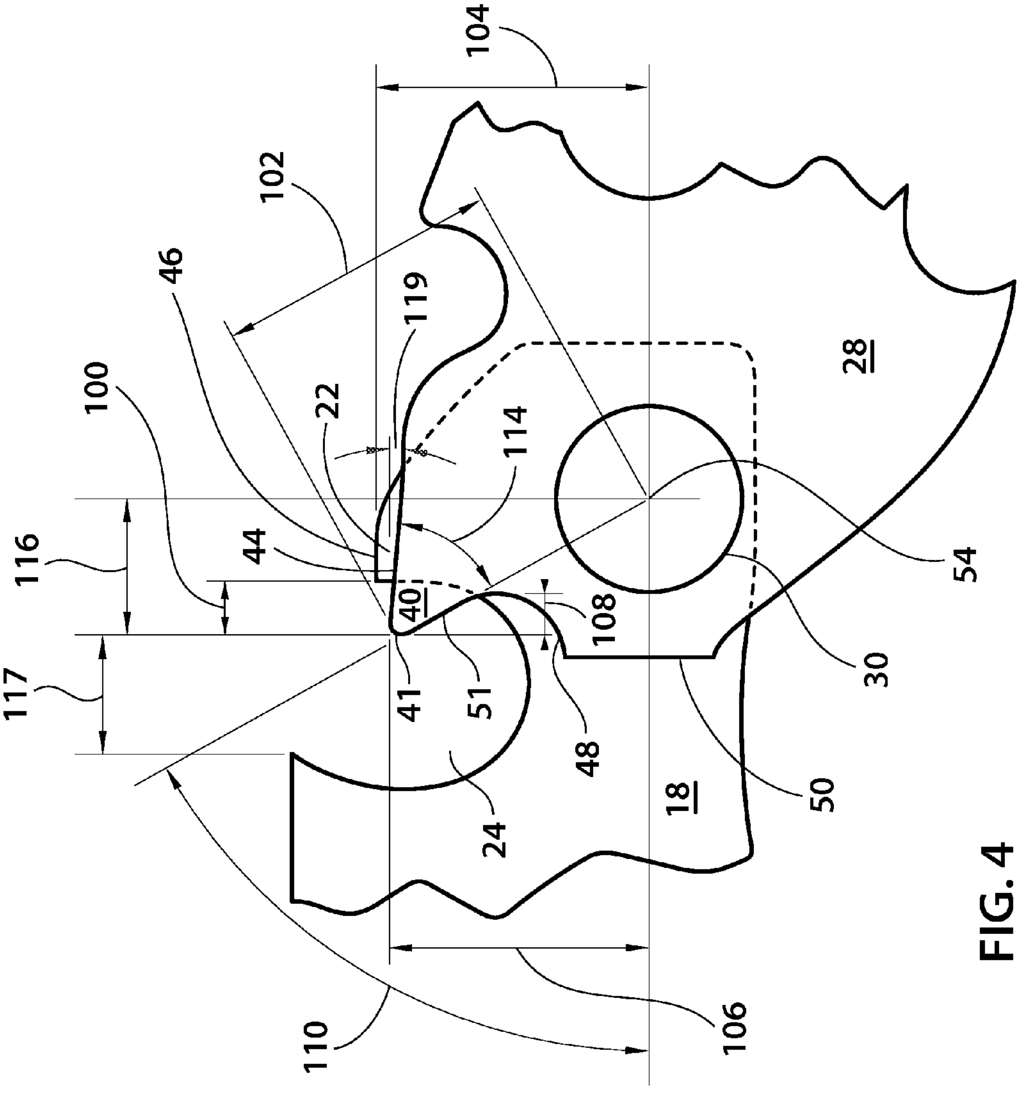
FIG. 4 illustrates a partial side view of a cutting link coupled to a drive link in accordance with various embodiments.
Figure 5:
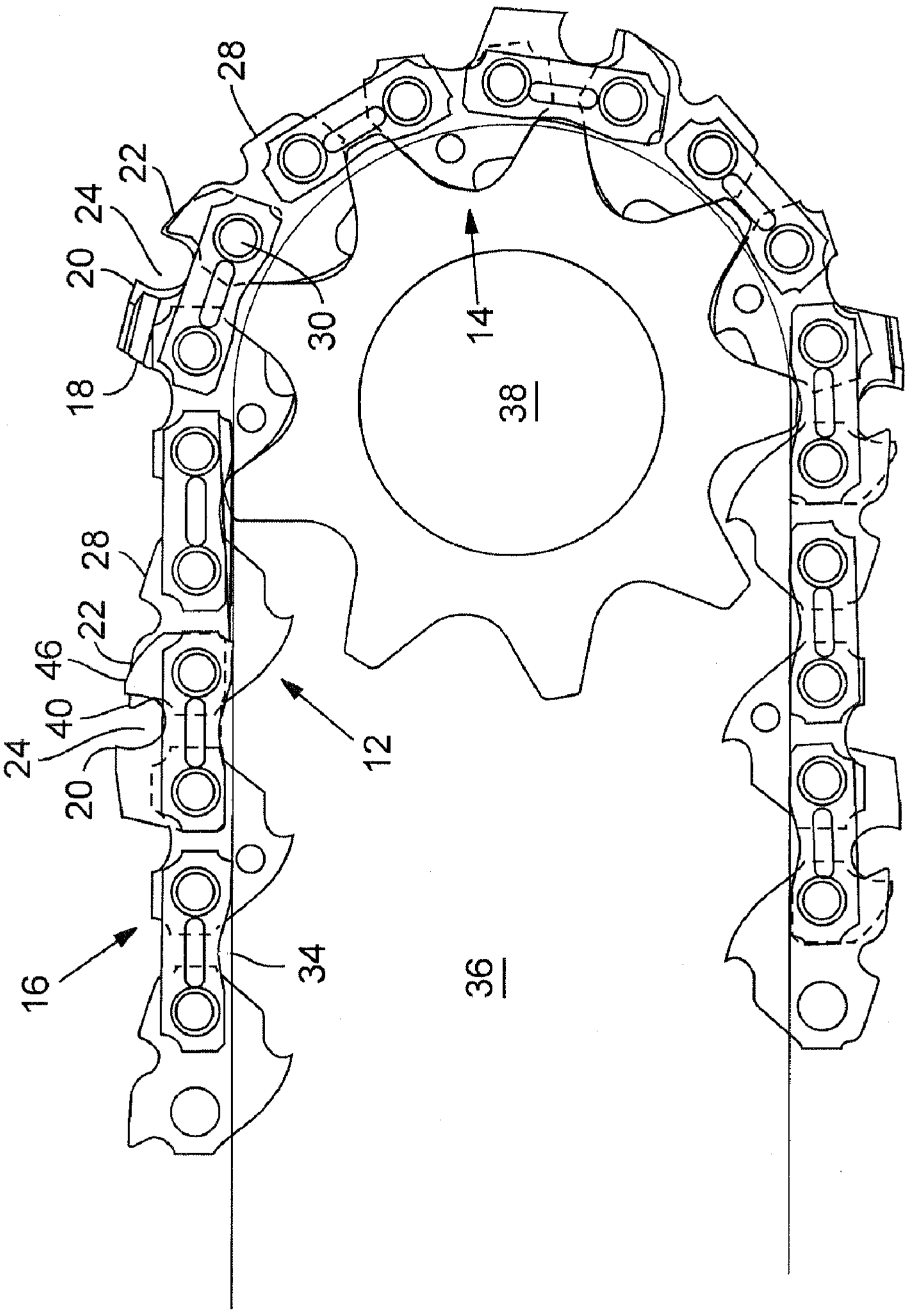
FIG. 5 illustrates a side view of a cutting chain in accordance with various embodiments.

In some embodiments, the height of a top edge 44 of the tail 40 may be less than the height of an upper surface 46 of a depth gauge 22, when such components are traversing the straight runs of the upper and lower bar rails of a guide bar 36. Such height differential may make maintaining the cutter depth gauge easier in that the tail may not obstruct the depth gauge during filing and maintenance FIGS. 2-4 are side views of a cutting link and drive link illustrating a respective first position 12 and second position 14 of a portion of a saw chain 16 in accordance with various embodiments of the invention. FIG. 5 illustrates a side view of the end of a guide bar having a saw chain disposed thereon both in the first position and the second position in accordance with various embodiments. The saw chain 16 may include a cutter link 18 having a cutting edge 20 and a depth gauge 22 separated by a gullet 24. The depth gauge 22 may have an upper surface 46 and a rear face 23 that generally faces gullet 24. The cutter link 18 may be coupled with a drive link 28 with, for example, a rivet 30. A longitudinal first centerline 55 may be disposed through rivet 30 and adjacent rivet holes 27 (rearward cutter link rivet hole) and 29 (forward drive link rivet hole). A second rivet centerline 57 may be disposed through the center of forward drive link rivet hole 29, perpendicular to the longitudinal first centerline 55, and generally coplanar with the drive link 28. The cutter link 18 and the drive link 28 may be in a first position 12 while traversing on a generally straight run of a bar rail 34 of a bar 36 and may be in the second position 14 while traversing circumferentially around a nose 38 of the bar 36.

In various embodiments, the drive link 28 may include tail 40 that is adapted to extend partway into the upper region 42 of the gullet 24. The tail 40 may have a top edge 44, which in some embodiments may be lower than the upper surface 46 of depth gauge 22 while in the first position 12. The drive link 28 may have a concavity 48 on a trailing edge 50, and may include a forward most portion 49 disposed below and in front of a tip or rearmost portion 41 of the tail 40. In various embodiments, the rearmost portion 41 of tail 40 may be disposed a first distance 111 from the perpendicular second centerline 57, and the forward most portion 49 of concavity 48 may be disposed a second distance 113 from the perpendicular second centerline 57. In various embodiments, the first distance 111 is greater than the second distance 113, such that the forward most portion 49 is closer than the rearmost portion 41 to the perpendicular second centerline 57. In various embodiments, the concavity 48 is sized to reduce the amount of drive link material that protrudes into the gullet 24 of the cutter link, which in turn reduces the impact on the flow of chips through the gullet 24 promoting better cutting performance.

In various embodiments, as the saw chain traverses the nose of the guide bar, i.e. with the saw chain 16 in the second position 14, the drive link 28 and the cutter link 18 may pivot with respect to each other about rivet 30. In doing so, the tail 40 may extend radially outward from a center of nose 38 as the tail traverses the nose. In some embodiments, as the tail 40 traverses the nose 38, a rearward portion 52 of the tail 40 may substantially align (e.g. extend radially from the center of nose 38) with the upper surface 46 of depth gauge 22 at its point of greatest radial extension. Such alignment may present a larger surface area relative to the kerf width which may help resist kickback when traversing the nose 38. In other embodiments, the end of the tail 40 may extend radially further or less than the depth gauge.

FIG. 4 illustrates a detailed breakaway view of a portion of FIG. 2. Various embodiments may include proportions of saw chain components having pre-selected values such that while in the first position 12 it may help maintain performance, and while in the second position 14 kickback is minimized. In one embodiment, the radial tail dimension 102, i.e. the radial distance from the center 54 of the rivet 30 to a tip 41 of the tail 40 and the depth gauge height 104, i.e. distance from the center 54 to the upper surface 46 of the depth gauge 22 may be modified for optimum cutting and kickback prevention. In one embodiment, the radial tail dimension 102 may be substantially equal to the depth gauge height 104. In various embodiments as the depth gauge is filed down, so to may the tip 41, rear portion 52 (which may include tip 41), and/or upper surface 44 so as to maintain generally a desired ratio (e.g. a one to one ratio).

In various embodiments, the tail 40 may extend into the gullet 24 a predetermined amount as indicated as tail extension distance 100, thereby leaving a gullet distance 117. Gullet distance 117 may be held above a minimum in order to enable maintenance and file access. It is also desirable to have gullet distance 117 at a maximum to promote chip flow and maximize performance. In various embodiments the ratio of tail extension distance 100 and the gullet distance 117 may be between 0.06 and 0.43. In one embodiment, the ratio between the extension distance 100 and the gullet distance 117 may be substantially equal to 0.06.

The height of the top edge 44 of tail 40 above the center 54 of the rivet 30 may be indicated as tail height 106, and may be altered as desired to improve performance, decrease kickback and improve maintainability of the chain. In various embodiments the tail height 106 may be a predetermined percentage of the depth gauge height 104 such as, a range of 80-100%. In further embodiments, the tail height 106 may be kept below the height of the depth gauge height 104, which may reduce the need for maintenance (e.g. filing) on the tail throughout the life of the saw chain.

The concavity depth 108 of the concavity 48 may be altered in order to control the amount of material disposed in the gullet 24. The concavity depth 108 may also be a predetermined percentage or multiple of other dimensions of the arrangement. In one embodiment, the concavity depth 108 may be between 50% and 100% of tail extension distance 100. In various embodiments, the concavity depth 108 may be greater than tail extension distance 100. In one embodiment, concavity 48 can be reduced by reducing tail extension distance 100.

In one embodiment, the tip 41 may be measured from the center 54 of the rivet 30, resulting in horizontal tail dimension 116. In various embodiments, for example, with saw chains with a rivet pitch (distance between rivets—not shown) of approximately 0.375" the center 54 to tip 41 horizontal tail dimension 116 may be within a range of approximately 0.06" to 0.15".

In various embodiments, the top edge 44 of the tail 40 and an upper concavity edge 51 of the tail 40 may define an angle 114 which may be in a range substantially between 20° and 80°. In various embodiments this angle may be substantially equal to 60° degrees. In one embodiment concavity 48 can be increased by decreasing tail angle 114 while maintaining tail extension distance 100. In various embodiments, the upper concavity edge 51 may define a concavity angle 110 with the horizontal that may be approximately within a range between 20° and 80°. In one embodiment the concavity angle 110 may be approximately 64°. The top edge 44 of tail 40 may define a top edge angle 119 with the horizontal and may be in a range substantially between 0° and ±3°.

In one embodiment, the concavity may have a bottom facing angled trailing edge 51. In another embodiment, the concavity may have a bottom facing radius trailing edge. Other embodiments may include a bottom facing trailing edge comprised of one or more angled and or radius edges.

In addition to the discussion and illustrations of various embodiments above, it is to be understood, however, that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein.

What is claimed is:

1. A drive link for a saw chain, comprising:

a forward rivet hole and a rearward rivet hole, wherein the forward rivet hole and the rearward rivet hole define a first centerline that is generally parallel to a rail of a guide bar, and the forward rivet hole further defines a second centerline that is generally perpendicular to the first centerline, wherein the first centerline and the second centerline are generally coplanar with the drive link;

a top edge comprising a tail portion having a trailing end tip disposed a first distance from the second centerline along a line perpendicular to the second centerline, wherein the tail portion is configured to substantially overlap and align with an upper surface of a cutting link depth gauge when the cutting link depth gauge is pivotally coupled to the drive link at the rearward rivet hole, as the drive link traverses a nose of the guide bar; and a concavity formed between the top edge and a trailing edge of the drive link, wherein the concavity has a forward-most portion disposed below the top edge and at a second distance from the second centerline along a line perpendicular to the second centerline, the second distance being shorter than the first distance.

2. The drive link of claim 1, wherein the concavity comprises a concavity angle between approximately 20 degrees and 80 degrees.

3. The drive link of claim 1, wherein the tail portion comprises a tail angle between approximately 20 degrees and 80 degrees.

4. The drive link of claim 1, wherein the concavity comprises a concavity depth, wherein the concavity depth is the difference between the first distance and the second distance.

5. The drive link of claim 1 wherein a rearmost point of the trailing edge of the drive link is disposed a third distance from the second centerline along a line perpendicular to the second centerline, the third distance being longer than the second distance.

6. The drive link of claim 1 wherein a rearmost point of the trailing edge of the drive link is disposed a third distance from the second centerline along a line perpendicular to the second centerline, the third distance being longer than the first distance and the second distance.

7. A saw chain, comprising:

a cutting link comprising a cutting edge disposed at a first height relative to a guide bar rail, a depth gauge disposed generally at or below the first height, and a gullet formed between the cutting edge and the depth gauge; and a drive link, coupled to the cutter link, wherein the drive link comprises:

a forward rivet hole and a rearward rivet hole, wherein the forward rivet hole and the rearward rivet hole define a first centerline, and the forward rivet hole further defines a second centerline that is generally perpendicular to the first centerline and generally coplanar with the drive link;

a tail portion having an end tip, wherein the tail portion substantially aligns with an upper surface of the depth gauge of the cutting link as the drive link traverses the nose of the guide bar, and wherein the tip is disposed at a first distance from the second centerline along a line perpendicular to the second centerline; and a concavity disposed between the tip and a trailing edge of the drive link, wherein the concavity has a forward-most portion disposed a second distance from the second centerline along a line perpendicular to the second centerline, the second distance being shorter than the first distance.

8. The saw chain of claim 7, wherein the tail portion is configured to extend into the gullet of the cutting link a tail extension distance as the drive link traverses a straight portion of the guide bar, wherein a ratio of tail extension distance to a gullet distance is about 0.06.

9. The saw chain of claim 7, wherein the tail portion has a radial tail dimension that is substantially equal to a height of the depth gauge with reference to a common pivot point.

10. The saw chain of claim 7, wherein the tip is positioned below the depth gauge in a first position, and substantially aligned with the depth gauge in a second position.

11. The saw chain of claim 7 wherein a rearmost point of the trailing edge of the drive link is disposed a third distance from the second centerline along a line perpendicular to the second centerline, the third distance being longer than the second distance.

12. The saw chain of claim 7 wherein a rearmost point of the trailing edge of the drive link is disposed a third distance from the second centerline along a line perpendicular to the second centerline, the third distance being longer than the first distance and the second distance.

13. A saw chain, comprising:

a cutting link comprising a cutting edge disposed at a first height relative to a guide bar rail, a depth gauge disposed generally below the first height, and a gullet formed between the cutting edge and the depth gauge; and a drive link, coupled to the cutter link, wherein the drive link includes a forward rivet hole and a rearward rivet hole, wherein the forward rivet hole and the rearward rivet hole define a first centerline that is generally parallel to a rail of a guide bar, and the forward rivet hole further defines a second centerline that is generally perpendicular to the first centerline, wherein the first centerline and the second centerline are generally coplanar with the drive link;

the drive link further comprising a top edge having a tail portion with a trailing end tip disposed a first distance from the second centerline along a line perpendicular to the second centerline, wherein the end tip of the tail is disposed below the first height of the cutting edge as the saw chain traverses a nose of the guide bar; and a concavity formed between the top edge and a trailing edge of the drive link, wherein the concavity has a forward-most portion disposed below the top edge and at a second distance from the second centerline along a line perpendicular to the second centerline, the second distance being shorter than the first distance.

14. The saw chain of claim 13, wherein the tail portion substantially aligns with an upper surface of the depth gauge of the cutting link as the drive link traverses the nose of the guide bar.

15. The saw chain of claim 13 wherein a rearmost point of the trailing edge of the drive link is disposed a third distance from the second centerline along a line perpendicular to the second centerline, the third distance being longer than the second distance.

16. The saw chain of claim 13 wherein a rearmost point of the trailing edge of the drive link is disposed a third distance from the second centerline along a line perpendicular to the second centerline, the third distance being longer than the first distance and the second distance.

* * * * *